United States Patent
Seto et al.

[11] Patent Number: 5,998,316
[45] Date of Patent: Dec. 7, 1999

[54] ULTRAVIOLET AND INFRARED RADIATION ABSORBING AND LOW TRANSMITTING GLASS

[75] Inventors: Hiromitsu Seto; Yukihito Nagashima; Shigekazu Yoshii, all of Osaka, Japan

[73] Assignee: Nippon Sheet Glass Co., Ltd., Osaka, Japan

[21] Appl. No.: 08/979,858

[22] Filed: Nov. 26, 1997

[30] Foreign Application Priority Data

Dec. 19, 1996 [JP] Japan .................................. 8-339590

[51] Int. Cl.⁶ .................................................. C03C 3/087
[52] U.S. Cl. ................................ 501/71; 501/71; 501/904
[58] Field of Search ........................... 501/55, 68, 72, 501/70, 71, 69, 904, 905; 428/426

[56] References Cited

U.S. PATENT DOCUMENTS

| | | | |
|---|---|---|---|
| 5,077,133 | 12/1991 | Cheng | 428/426 |
| 5,240,886 | 8/1993 | Gulotta et al. | 501/70 |
| 5,264,400 | 11/1993 | Nakaguchi et al. | 501/71 |
| 5,320,986 | 6/1994 | Taniguchi et al. | 501/70 |
| 5,344,798 | 9/1994 | Morimoto et al. | 501/70 |
| 5,362,689 | 11/1994 | Morimoto et al. | 501/70 |
| 5,411,922 | 5/1995 | Jones | 501/71 |
| 5,593,929 | 1/1997 | Krumwiede et al. | 501/70 |
| 5,688,727 | 11/1997 | Shelestak et al. | 501/71 |

FOREIGN PATENT DOCUMENTS

| | | |
|---|---|---|
| 653388 | 11/1994 | European Pat. Off. . |
| 4313215 | 10/1993 | Germany . |
| 9600194 | 1/1996 | WIPO . |

OTHER PUBLICATIONS

JP 06 247 740 A (Derwent Abstract).

*Primary Examiner*—Deborah Jones
*Assistant Examiner*—Stephen Stein
*Attorney, Agent, or Firm*—Sughrue, Mion, Zinn Macpeak & Seas, PLLC

[57] ABSTRACT

An ultraviolet and infrared radiation absorbing and low transmitting glass having neutral gray to neutral grayish green tint and also having low visible light and solar energy transmission and a low ultraviolet light transmission, further showing an excellent protection of interior trim of automobiles against deterioration and fading, and also showing privacy protection effect when applied especially to window glass of automobiles and to window glass of buildings. The ultraviolet and infrared radiation absorbing and low transmitting glass comprising in % by weight: basic glass components comprising 65 to 80% $SiO_2$, 0 to 5% $Al_2O_3$, 0 to 10% MgO, 5 to 15% CaO, 5 to 15% MgO+CaO, 10 to 20% $Na_2O$, 0 to 5% $K_2O$, 10 to 20% $Na_2O+K_2O$, and 0 to 5% $B_2O_3$, and coloring components comprising 0.65 to 0.95% total iron oxide (T-$Fe_2O_3$) in terms of $Fe_2O_3$, 0.9 to 2.3% $TiO_2$, 0 to 2.0% $CeO_2$, 0.019 to 0.04% CoO, 0 to 0.002% Se, and 0.01 to 0.2% NiO, wherein the glass has a visible light transmission (YA) and a solar energy transmission (TG) of 30% or less and 10 to 35%, respectively, when the glass has a thickness of 3.1 to 5 mm.

8 Claims, No Drawings

ULTRAVIOLET AND INFRARED RADIATION ABSORBING AND LOW TRANSMITTING GLASS

FIELD OF THE INVENTION

The present invention relates to an ultraviolet and infrared radiation absorbing and low transmitting glass useful as a privacy protection glass used especially for automobiles, since it has neutral gray to neutral grayish green tint and further has low visible light and solar energy transmission and a low ultraviolet light transmission.

BACKGROUND OF THE INVENTION

In order to meet the demand for protection of interior trim of automobiles against deterioration, which has been increasing with the recent trend to luxury of the interior trim, and to reduce the load of air conditioning, various glass having ultraviolet and infrared absorbing power has recently been proposed as window glass for automobiles. Among these proposed glass, for rear side window and rear window glass of automobiles, a glass having a low visible light transmission is preferentially used in view of protection of privacy. As such glass, mention may be made of the following glass.

For example, a colored glass composition for window glass disclosed in JP-A-6-503300 (PCT) is a glass having total energy transmission ($T_E$) which is smaller than a light transmission under the illuminant A ($TL_A$). Regarding a glass having a thickness of 3.85 mm, $T_E$ is 10 to 48% and $TL_A$ is 20 to 60%. This glass contains, in % by weight: 0.45 to 2.5% $Fe_2O_3$ (total iron content), 0.001 to 0.02% CoO, 0 to 0.0025% Se and 0 to 0.1% $Cr_2O_3$, as colorants.

A neutral dark gray glass disclosed in U.S. Pat. No. 5,393,593 claims in claim 25 a colorant comprising in soda-lime-silica glass, in % by weight: 1.00 to 2.2% $Fe_2O_3$ (total iron), at least 0.20% FeO, 0.0005 to 0.005% Se and 0.010 to 0.030% CoO. This glass has a light transmission of 35% or less and a total solar infrared radiation transmission of less than 20% at a thickness of 3.9 mm.

A gray soda lime glass disclosed in JP-A-8-59287 (the term "JP-A" as used herein means an "unexamined published Japanese patent application) contains in soda-lime-silica glass a colorant comprising, in % by weight: 0.5 to 0.9% $Fe_2O_3$, 0.012 to 0.025% CoO, 0.0025 to 0.010% Se and 0.005 to 0.020% $Cr_2O_3$. The colorant is used in an amount which makes a glass have a light transmission (TL) of less than 30% and an excitation purity (P) of less than 12%.

Further, a dark gray glass disclosed in JP-A-8-157232 contains in soda-lime-silica glass a colorant comprising, in % by weight: 0.8 to 1.4% $Fe_2O_3$ (total iron content), 0.21% or less FeO, 0.05 to 1.0% $TiO_2$, 0.02 to 0.05% CoO, and 0.0005 to 0.015% Se.

The colored glass composition for window glass disclosed in the above-described JP-A-6-503300 (PCT) has a relatively high visible light transmission and, therefore, privacy protection effect attempted by the present invention cannot be achieved. Further, in order to obtain a desired tint, a large amount of $Fe_2O_3$ is used.

The neutral dark gray glass disclosed in the above-described U.S. Pat. No. 5,393,593 has a high total iron content.

Further, the above-described any conventional glass does not essentially contain nickel but contains a high concentration of selenium, whereby desired optical characteristics can be obtained.

Selenium is vaporized in the course of melting in an amount of nearly 90% of batch charge. Therefore, it must be previously added to the batch in an amount of about ten times the required amount. Selenium is, however, extremely toxic, so that using such a large amount of selenium is not desirable from the standpoint of prevention of environmental pollution.

The above-described glass has a high total iron content. Therefore, due to radiant heat resulted from heat radiation absorbing effect of ferrous oxide, temperature at a crown of a melting tank may have the possiblity to reach its heat-resistant temperature or more in the course of melting. Thus, the production of glass by means of an ordinary glass melting tank has many difficulties.

The gray soda lime glass disclosed in the above-described JP-A-8-59287 uses a large amount of Se and $Cr_2O_3$ in order to obtain a desired tint.

As can be seen that $Cr_2O_3$ is often observed as black particles of chromite stone in glass, it is difficult for $Cr_2O_3$ to melt in glass, and high temperature is needed to melt. Therefore, use of $Cr_2O_3$ is not preferable in a practical production.

The dark gray glass disclosed in the above-described JP-A-8-157232 also uses a large amount of Se in order to obtain a desired tint. Further, total iron content is relatively high. Therefore, the content of $TiO_2$, i.e., a colorant for cutting ultraviolet radiation, is small.

SUMMARY OF THE INVENTION

The present invention has been achieved in view of the above-described problems of the prior art.

Accordingly, an object of the present invention is to provide an ultraviolet and infrared radiation absorbing and low transmitting glass which can be readily produced using an ordinary glass melting tank, which contains Se in a very small amount or does not contain Se at all, which has neutral gray to neutral grayish green tint, and which has low visible light tranmission, low solar enery transmission, and low ultraviolet light transmission.

According to the present invention, there is provided an ultraviolet and infrared radiation absorbing and low transmitting glass comprising, in % by weight:

basic glass components comprising
   65 to 80% $SiO_2$,
   0 to 5% $Al_2O_3$,
   0 to 10% MgO,
   5 to 15% CaO,
   5 to 15% MgO+CaO,
   10 to 18% $Na_2O$,
   0 to 5% $K_2O$,
   10 to 20% $Na_2O+K_2O$, and
   0 to 5% $B_2O_3$, and
coloring components comprising
   0.65 to 0.95% total iron oxide (T-$Fe_2O_3$) in terms of $Fe_2O_3$,
   0.9 to 2.3% $TiO_2$,
   0 to 2.0% $CeO_2$,
   0.019 to 0.04% CoO,
   0 to 0.002% Se, and
   0.01 to 0.2% NiO,
wherein the glass has a visible light transmission (YA) of 30% or less and and a solar energy transmission (TG) of 10 to 35%, when the glass has a thickness of 3.1 to 5 mm.

In the above embodiment, $TiO_2$ content is preferably 1.1 to 2.3%.

In the above embodiment, total iron oxide content in terms of $Fe_2O_3$ is preferably 0.65 to 0.85%.

In the above embodiment, Se content is preferably 0 to 0.0008%.

The ultraviolet and infrared radiation absorbing and low transmitting glass in the above embodiment preferably has optical characteristics that a dominant wavelength (Dw) as measured with the CIE standard illuminant C in a wavelength region of 380 to 770 nm is 480 to 570 nm and an excitation purity (Pe) is less than 10%, when the glass has a thickness of 3.1 to 5 mm.

Further, the ultraviolet and infrared radiation absorbing and low transmitting glass in the above embodiment preferably has optical characteristics that an ultraviolet transmission (Tuv) defined in ISO is less than 10%, when the glass has a thickness of 3.1 to 5 mm.

In the above embodiment, FeO content in terms of $Fe_2O_3$, as a colorant, is preferably 0.12 to 0.40%.

Further, in the above embodiment, ZnO can be included in an amount of up to 0.5%, and preferably 0.01 to 0.3%.

DETAILED DESCRIPTION OF THE INVENTION

The reasons for limitations of the basic glass components of the ultraviolet and infrared radiation absorbing and low transmitting glass according to the present invention are explained below. Hereinafter, all percents are by weight.

$SiO_2$ is a main component for network forming. If the $SiO_2$ content is less than 65%, the glass has poor durability, and if it exceeds 80%, the glass composition is difficult to melt.

$Al_2O_3$ is a component for improving durability of glass. However, if the $Al_2O_3$ content exceeds 5%, the glass is difficult to melt. A preferable $Al_2O_3$ content is 0.1 to 2%.

Both MgO and CaO are used for improving durability of glass and also for controlling a liquidus temperature and a viscosity in forming a glass. If the MgO content exceeds 10%, the liquidus temperature rises. If the CaO content is less than 5% or higher than 15%, the liquidus temperature rises. If the total content of MgO and CaO is less than 5%, durability of the resulting glass deteriorates, and if the total content thereof exceeds 15%, the liquidus temperature rises.

$Na_2O$ and $K_2O$ are used as glass melting accelerator. If the $Na_2O$ content is less than 10% or total content of $Na_2O$ and $K_2O$ is less than 10%, the effect of melting acceleration is poor. On the other hand, if the $Na_2O$ content exceeds 18%, or if the total content of $Na_2O$ and $K_2O$ exceeds 20%, durability of glass is decreased. It is preferable that the $K_2O$ content is up to 5%, because use of $K_2O$ in a large amount increases costs of glass.

$B_2O_3$ is a component generally used for the improvement of durability of glass or as a melting aid, but also functions to enhance ultraviolet absorption. If the $B_2O_3$ content exceeds 5.0%, absorption of the ultraviolet transmission is extended to the visible region, so that not only the tint tends to be yellowish, but also disadvantages may occur in forming glass due to volatilization of $B_2O_3$ and the like. Accordingly, the upper limit of the $B_2O_3$ content should be 5.0%.

Iron oxide is present in glass in the form of $Fe_2O_3$ and FeO. $Fe_2O_3$ is a component which serves to enhance ultraviolet radiation absorbing power, and FeO is a component which serves to enhance heat radiation absorbing power.

If the FeO content is too small, the heat radiation absorbing power is decreased, and if it is too large, exertion of absorption by FeO is extended to the visible region, so that the visible light transmission is decreased. Further, where glass is melted in an ordinary glass melting tank, temperature at a ceiling of a melting tank may have the possibility to reach its heat-resistant temperature with a radiation heat by a radiation heat absorbing effect of FeO, which is not preferable. It has been found in the present invention that by determining the amount of FeO in terms of $Fe_2O_3$ so as to satisfy the range of from 0.12 to 0.40%, a desirable heat radiation absorbing power can be obtained while having a low visible light transmission and neutral gray to neutral grayish green tint.

When total iron oxide in terms of $Fe_2O_3$ is less than 0.65%, ultraviolet and infrared absorption effect is small and, therefore, desired optical characteristics cannot be obtained. On the other hand, if $Fe_2O_3$ is contained in an amount more than 0.95%, the above-described disadvantages resulted from a large amount of FeO are liable to occur. Thus, it becomes difficult to melt a glass composition in an ordinary glass melting tank. Where the amount of CoO used is large as in the present invention, the amount of the total iron oxide is more preferably 0.65 to 0.85%.

$TiO_2$ is a component for enhancing the ultraviolet radiation absorbing power by the interaction with FeO. In the present invention, in particular, $TiO_2$ is an essential component for decreasing extinction purity by using the same in combination with NiO and also for obtaining neutral gray to neutral grayish green tint. If the $TiO_2$ content is less than 0.9%, such disadvantages may occur that sufficient ultraviolet radiation absorption power cannot be obtained, tint is bluish and an extinction purity is high. On the other hand, if it exceeds 2.3%, tint is yellowish, which is deviated from a desired tint. The $TiO_2$ content is preferably 1.1 to 2.3%.

$CeO_2$ is a component which serves to enhance ultraviolet radiation absorbing power, and is present in glass in the form of $Ce^{3+}$ or $Ce^{4+}$. Where $CeO_2$ is used alone, $Ce^{3+}$ has particularly a low visible light absorption and, therefore, is effective in ultraviolet radiation absorption. However, by coexisting the same with $TiO_2$ in glass, ultraviolet radiation absorbing effect due to the interaction with $Ti^{4+}$ can also be obtained. In order to avoid a high cost of a resulting glass due to the use of an expensive $CeO_2$ without impairing neutral gray to neutral grayish green tint which is aimed by the present invention, the $CeO_2$ content is preferably 2.0% or less.

CoO is a component for obtaining neutral gray to neutral grayish green tint by the coexistence with NiO and/or Se, $Fe_2O_3$ and $TiO_2$. If the CoO content is less than 0.019%, the visible light transmission is too high, and if it exceeds 0.04%, the resulting glass undesirably has highly bluish tint and also has an excessively decreased visible light transmission.

Se is a component for decreasing excitation purity due to pink coloration in combination with the complementary color of CoO. Se content over 0.002% is not desirable from the standpoint of preventing environmental pollution. Further, in such an amount, the visible light transmission is decreased. The Se content is preferably 0 to 0.0008%.

NiO is an essential component for controlling the visible light transmission and for decreasing the excitation purity. If the content of NiO is less than 0.01%, sufficient effects cannot be obtained, and if it exceeds 0.2%, the visible light transmission is undesirably decreased excessively. The use of a large amount of NiO may form nickel sulfide inclusion in the resulting product. Therefore, the use of the same must be effected carefully.

In order to stabilize the production of glass and guarantee the quality of the product, it is necesary to suppress the generation of nickel sulfide inclusion as less as possible. ZnO may be added in an amount of 0.5% or less for suppressing the generation of nickel sulfide inclusion. If the amount of an expensive ZnO raw material added exceeds 0.5%, a batch cost is raised. ZnO is preferably added in the form of zinc sulfate ($ZnSO_4$ or $ZnSO_4.7H_2O$) or zinc nitrate ($Zn(NO_3)_2.6H_2O$). TheZnO conent is preferably 0.01 to 0.3%.

The glass having the compositions defined in accordance with the present invention may further contain one or two or more of MnO, $V_2O_5$, $MoO_3$, CuO, $Cr_2O_3$ or $SnO_2$ in the total amount of 0 to 1% for the purpose of controlling a tint and degree of reduction so long as a middle degree of transmission and neutral gray to neutral grayish green tint are not impaired.

The present invention will be described in more detail by reference to the following Examples. It should however be understood that the invention is not construed as being limited thereto.

EXAMPLES 1 TO 17

Ferric oxide, titanium oxide, cerium oxide, cobalt oxide, metallic selenium, nickel oxide, zinc sulfate and a carbonaceous material as a reducing agent were appropriately mixed with a typical soda-lime-silica glass batch. These raw materials were melted at 1,500° C. in an electric furnace. After melting for 4 hours, the molten glass was casted on a stainless steel plate and gradually cooled to room temperature to obtain a glass plate having a thickness of about 6 mm. Then, this glass plate was polished so as to have a thickness of 4 mm and used as a sample of the present Examples. The optical characteristics of the sample thus obtained were measured. That is, a visible light transmission (YA) measured with the CIE standard illuminant A, a total solar energy transmission (TG), an ultraviolet transmission (TuV) defined in ISO, a dominant wavelength (Dw), and an excitation purity (Pe) measured with the CIE standard illuminant C were obtained.

Concentrations of $T-Fe_2O_3$, FeO, CoO, Se, NiO, $CeO_2$ and $TiO_2$ of the samples obtained are shown in Table 1 below. In Table 1, concentrations are all percent by weight. The optical characteristics of each sample are also shown in Table 1.

TABLE 1

| | Ex.1 | Ex.2 | Ex.3 | Ex.4 | Ex.5 | Ex.6 | Ex.7 | Ex.8 | Ex.9 |
|---|---|---|---|---|---|---|---|---|---|
| $T-Fe_2O_3$ | 0.80 | 0.80 | 0.80 | 0.80 | 0.80 | 0.85 | 0.70 | 0.70 | 0.80 |
| $FeO/T-Fe_2O_3$ | 8.6 | 18.8 | 19.1 | 17.5 | 17.9 | 22.0 | 20.0 | 18.6 | 20.7 |
| NiO | 0.090 | 0.085 | 0.078 | 0.097 | 0.119 | 0.080 | 0.090 | 0.081 | 0.090 |
| Se | — | 0.0006 | 0.0008 | — | — | — | — | — | — |
| CoO | 0.025 | 0.025 | 0.025 | 0.027 | 0.027 | 0.019 | 0.030 | 0.025 | 0.026 |
| $TiO_2$ | 1.1 | 1.2 | 1.1 | 1.4 | 1.4 | 1.2 | 2.3 | 0.9 | 0.9 |
| $CeO_2$ | 0.1 | — | — | — | — | — | — | 1.9 | 1.0 |
| YA (%) | 20.0 | 18.1 | 18.2 | 17.7 | 15.6 | 21.3 | 16.4 | 21.2 | 15.9 |
| TG (%) | 26.2 | 25.5 | 25.8 | 25.3 | 23.8 | 21.0 | 24.4 | 28.3 | 21.9 |
| DW (nm) | 493 | 551 | 557 | 500 | 541 | 498 | 496 | 496 | 497 |
| Pe (%) | 7.2 | 4.4 | 4.8 | 5.0 | 5.6 | 6.4 | 7.2 | 7.2 | 6.7 |
| Tuv (%) | 9.7 | 9.6 | 9.8 | 7.2 | 6.7 | 8.7 | 6.8 | 6.9 | 7.1 |

| | Ex.10 | Ex.11 | Ex.12 | Ex.13 | Ex.14 | Ex.15 | Ex.16 | Ex.17 |
|---|---|---|---|---|---|---|---|---|
| $T-Fe_2O_3$ | 0.80 | 0.80 | 0.70 | 0.70 | 0.65 | 0.75 | 0.80 | 0.95 |
| $FeO/T-Fe_2O_3$ | 21.0 | 21.0 | 20.0 | 19.4 | 20.5 | 20.8 | 21.3 | 20.3 |
| NiO | 0.021 | 0.025 | 0.162 | 0.154 | 0.017 | 0.1 | 0.200 | 0.097 |
| Se | 0.0007 | 0.0018 | — | — | — | — | — | — |
| CoO | 0.027 | 0.021 | 0.025 | 0.038 | 0.021 | 0.029 | 0.04 | 0.025 |
| $TiO_2$ | 1.0 | 1.1 | 1.3 | 1.29 | 1.7 | 1.6 | 1.4 | 1.3 |
| $CeO_2$ | 0.7 | — | — | — | — | — | — | — |
| YA (%) | 17.4 | 23.5 | 10.0 | 10.2 | 29.6 | 14.5 | 6.2 | 14.8 |
| TG (%) | 22.1 | 27.2 | 19.8 | 20.3 | 33.7 | 22 | 12.8 | 19.2 |
| DW (nm) | 497 | 491 | 626 | 501 | 483 | 493 | 557 | 502 |
| Pe (%) | 6.1 | 4.0 | 4.3 | 5 | 9.8 | 8.2 | 9.6 | 5.6 |
| Tuv (%) | 5.8 | 6.1 | 9.4 | 9.7 | 9.1 | 8.7 | 7.3 | 6.7 |

Examples 1 to 17 have the compositions fallen within the broad range claimed in the present invention. As is apparent from Table 1, samples of Examples 1 to 17 are glass having preferable optical characteristics.

Of those Examples, Examples 1 to 7 and 11 to 17 have compositions having a preferable range of $TiO_2$. Because of a large $TiO_2$ content, a decreased ultraviolet transmission can be obtained without including an expensive $CeO_2$.

Examples 1 to 16 have compositions having a preferable range of the total iron oxide. Because of a small amount of a total iron oxide, glass can be readily produced with such compositions using an ordinary melting tank.

Examples 1 to 10 and 12 to 17 have compositions having a preferable range Se. Because of a small amount of Se content, such compositions are preferable on preventing environmental pollution. Further, in spite of having a low Se content, neutral gray to neutral grayish green tint can be obtained.

Accordingly, if the glass of those Examples is used as a window glass for automobiles and buildings, an excellent privacy protection effect can be expected without impairing excellent protection of interior trim of automobiles against deterioration and safety.

EXAMPLES 18 TO 21

Number of NiS per unit weight when Ni is added to a batch having a composition within the range of the present invention (Example 18) and numbers of NiS per unit weight when zinc sulfate is further added (Examples 19 to 21) are shown in Table 2 below.

TABLE 2

|  | Ex.18 | Ex.19 | Ex.20 | Ex.21 |
|---|---|---|---|---|
| Ni content(%) | 0.04 | 0.04 | 0.06 | 0.06 |
| ZnO content(%) | — | 0.01 | 0.15 | 0.3 |
| NiS (number/g) | 0.6 | 0.4 | 0.3 | 0.1 |

As is apparent from Table 2, the glasses of Examples 19 to 21 are greatly suppressed in the formation of NiS because of addition of a very small amount of ZnO.

COMPARATIVE EXAMPLE 1 TO 6

Comparative Examples of the present invention are shown in Table 3 below. Compositions of the Comparative Examples 1 to 6 all are fallen outside the scope of present invention. Of those Comparative Examples, Comparative Example 1 shows one example of the compositions described in the Examples of JP-A-6-503300 (PCT) mentioned hereinbefore and the characteristics thereof; Comparative Example 2 shows one example of the compositions described in the Examples of U.S. Pat. No. 5,393,593 mentioned hereinbefore and the characteristics thereof; Comparative Example 3 shows one example of the compositions described in the Examples of JP-A-8-59287 mentioned hereinbefore and the characteristics thereof; Comparative Example 4 shows one example of the compositions described in the Examples of JP-A-8-157232 mentioned hereinbefore and the characteristics thereof; Comparative Example 5 shows a composition wherein the amount of $TiO_2$ which is a colorant is not fallen within a range of the present invention and the characteristics thereof; and Comparative Example 6 shows a composition wherein the amounts of NiO and CoO which are colorants are not fallen within a range of the present invention and the characteristics of the composition. It should be noted that optical characteristics of Comparative Example 1 are shown in terms of values which will be obtained when the thickness of glass is 3.85 mm, optical characteristics of Comparative Example 2 are shown in terms of values which will be obtained when the thickness of glass is 3.9 mm, and optical characteristics of Comparative Example 4 are shown in terms of values which will be obtained when the thickness of glass is 5 mm.

TABLE 3

|  | Comp. Ex.1 | Comp. Ex.2 | Comp. Ex.3 | Comp. Ex.4 | Comp. Ex.5 | Comp. Ex.6 |
|---|---|---|---|---|---|---|
| $T\text{-}Fe_2O_3$ | 1.25 | 1.07 | 0.581 | 0.82 | 0.8 | 0.8 |
| $FeO/T\text{-}Fe_2O_3$ | 28 | 31.4 | * | 11.0 | 20.4 | 21.7 |
| NiO | — | — | — | — | 0.0900 | 0.0400 |
| Se | 0.0015 | 0.0013 | 0.0034 | 0.0105 | — | — |
| CoO | 0.0102 | 0.0152 | 0.0175 | 0.0283 | 0.0235 | 0.0177 |
| TiO2 | — | — | — | 0.8 | 0.6 | 1.7 |
| $Cr_2O_3$ | — | — | 181 | — | — | — |
| Thickness(mm) | 3.85 | 3.9 | 4.0 | 5.0 | 4.0 | 4.0 |
| YA (%) | 33.5 | 28.32 | 28.6 | 9.0 | 20.2 | 30.9 |
| TG (%) | 21.6 | 19.51 | 35.9 | 23.5 | 25.1 | 29.5 |
| DW (nm) | 531 | 485.99 | 480.6 | 576 | 492.8 | 494.6 |
| Pe (%) | 2.8 | 10.86 | 11.6 | 2.8 | 7.44 | 6.78 |
| Tuv (%) | — | 16.74 | 11.8 | 3.2 | 13.54 | 7.82 |

*: Value is not described in the specification of JP-A-8-59287.

As is apparent from Table 3, the glass of Comparative Example 1 has a high visible light transmission as compared with the present invention, so that the glass is not within the scope of the present invention. The glass of Comparative Example 2 and that of Comparative Example 3 have a visible light transmission within the scope of the present invention, but both the excitation purity and ultraviolet transmission thereof are high and, therefore, these glass is fallen outside the scope of the present invention. Comparative Example 3 further has a high TG, so that it is not within the scope of the present invention. Comparative Example 4 has a large dominant wavelength and, therefore, is not within the scope of the present invention. Comparative Example 5 has a high ultraviolet transmission and Comparative Example 6 has a high visible light transmission, so that they are not within the scope of the present invention.

As described in detail hereinabove, the ultraviolet and infrared radiation absorbing and low transmitting glass according to the present invention makes it possible to produce an ultraviolet and infrared radiation absorbing and low transmitting glass having neutral gray to neutral grayish green tint and also having low visible light and solar energy transmission and a low ultraviolet light transmission, using an ordinary glass melting tank.

Further, the ultraviolet and infrared radiation absorbing and low transmitting glass according to the present invention shows, due to its characteristics, an excellent protection of interior trim of automobiles against deterioration and fading when applied to side and rear window glass of automobiles and to window glass of buildings, and also shows privacy protection effect without impairing safety.

While the invention has been described in detail and with reference to specific embodiments thereof, it will be apparent to one skilled in the art that various changes and modifications can be made therein without departing from the spirit and scope thereof.

What is claimed is:

1. An ultraviolet and infrared radiation absorbing and low transmitting glass comprising, in % by weight:
   basic glass components comprising
   65 to 80% $SiO_2$,
   0 to 5% $Al_2O_3$,
   0 to 10% MgO,
   5 to 15% CaO,
   5 to 15% MgO+CaO,
   10 to 18% $Na_2O$,
   0 to 5% $K_2O$,
   10 to 20% $Na_2O+K_2O$, and
   0 to 5% $B_2O_3$, and
   coloring components comprising
   0.65 to 0.95% total iron oxide ($T\text{-}Fe_2O_3$) in terms of $Fe_2O_3$,
   0.9 to 2.3% $TiO_2$,
   0 to 2.0% $CeO_2$,
   0.019 to 0.04% CoO,
   0 to 0.002% Se, and
   0.01 to 0.2% NiO,
   wherein said glass has a visible light transmission (YA) of 30% or less and a solar energy transmission (TG) of 10 to 35%, when said glass has a thickness of 3.1 to 5 mm.

2. The ultraviolet and infrared radiation absorbing and low transmitting glass as claimed in claim 1, wherein said $TiO_2$ content is 1.1 to 2.3%.

3. The ultraviolet and infrared radiation absorbing and low transmitting glass as claimed in claim 1, wherein said total iron oxide content in terms of $Fe_2O_3$ is 0.65 to 0.85%.

4. The ultraviolet and infrared radiation absorbing and low transmitting glass as claimed in claim 1, wherein said Se content is 0 to 0.0008%.

5. The ultraviolet and infrared radiation absorbing and low transmitting glass as claimed in claim 1, wherein said glass has a dominant wavelength (Dw) of 480 to 570 nm as measured with the CIE standard illuminant C and an excitation purity (Pe) of less than 10%, when said glass has a thickness of 3.1 to 5 mm.

6. The ultraviolet and infrared radiation absorbing and low transmitting glass as claimed in claim 1, wherein said galss has an ultraviolet transmission (Tuv) defined in ISO of 10% or less, when said glass has a thickness of 3.1 to 5 mm.

7. The ultraviolet and infrared radiation absorbing and low transmitting glass as claimed in claim 1, wherein said glass further contains ZnO in an amount of 0 to 0.5%.

8. The ultraviolet and infrared radiation absorbing and low transmitting glass as claimed in claim 7, wherein said ZnO content is 0.01 to 0.3%.

* * * * *